(12) United States Patent
Meagher et al.

(10) Patent No.: US 8,193,817 B2
(45) Date of Patent: Jun. 5, 2012

(54) INPUT CHANNEL DIAGNOSTICS

(75) Inventors: Thomas Bruce Meagher, Houston, TX (US); Gerald Robert Creech, Danbury (GB)

(73) Assignee: Rockwell Automation Limited, Maldon, Essex (GB)

( * ) Notice: Subject to any disclaimer, the term of this patent is extended or adjusted under 35 U.S.C. 154(b) by 463 days.

(21) Appl. No.: 12/361,612

(22) Filed: Jan. 29, 2009

(65) Prior Publication Data
US 2009/0195256 A1 Aug. 6, 2009

Related U.S. Application Data

(60) Provisional application No. 61/025,508, filed on Feb. 1, 2008.

(30) Foreign Application Priority Data

Sep. 26, 2008 (EP) .................................. 08165276

(51) Int. Cl.
*G01R 31/02* (2006.01)

(52) U.S. Cl. .......................................... 324/525; 324/500
(58) Field of Classification Search .................. 324/500, 324/525
See application file for complete search history.

(56) References Cited

U.S. PATENT DOCUMENTS 3,902,485 A * 9/1975 Wallace .................... 128/205.27
2001/0032054 A1* 10/2001 Kimoto et al. .................. 702/24

* cited by examiner

*Primary Examiner* — Vincent Q Nguyen
(74) *Attorney, Agent, or Firm* — Boyle Fredrickson, S.C.; William R. Walburn; John M. Miller

(57) ABSTRACT

Input channel diagnostics for an industrial process control system that provides improved apparatus and methods relating to fault containment, overload protection and input channel diagnostics. The input circuit includes one or more series resistors that have a total resistance that is at least two orders of magnitude greater than the magnitude of the resistance of a conditioned sensor signal source.

17 Claims, 9 Drawing Sheets

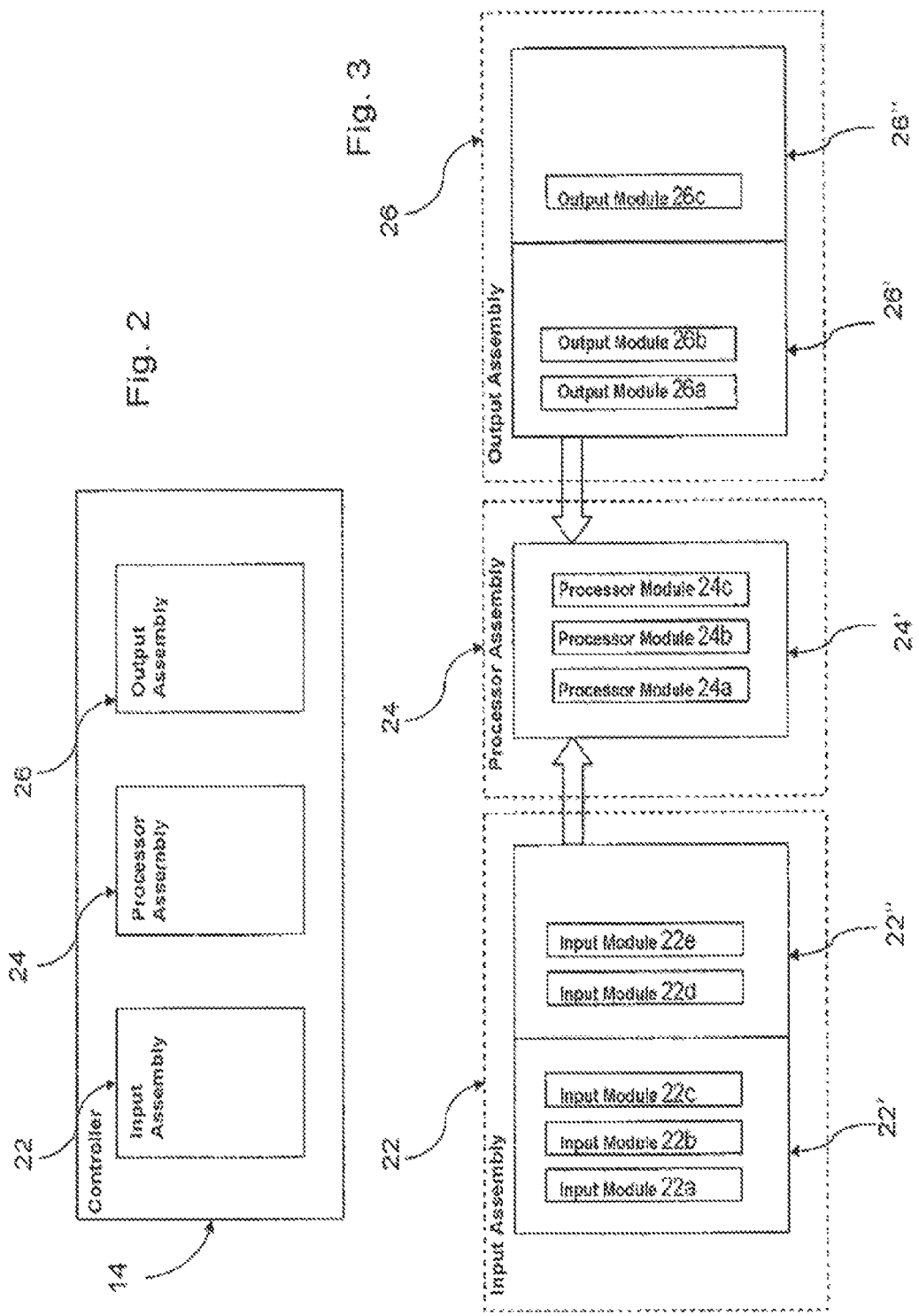

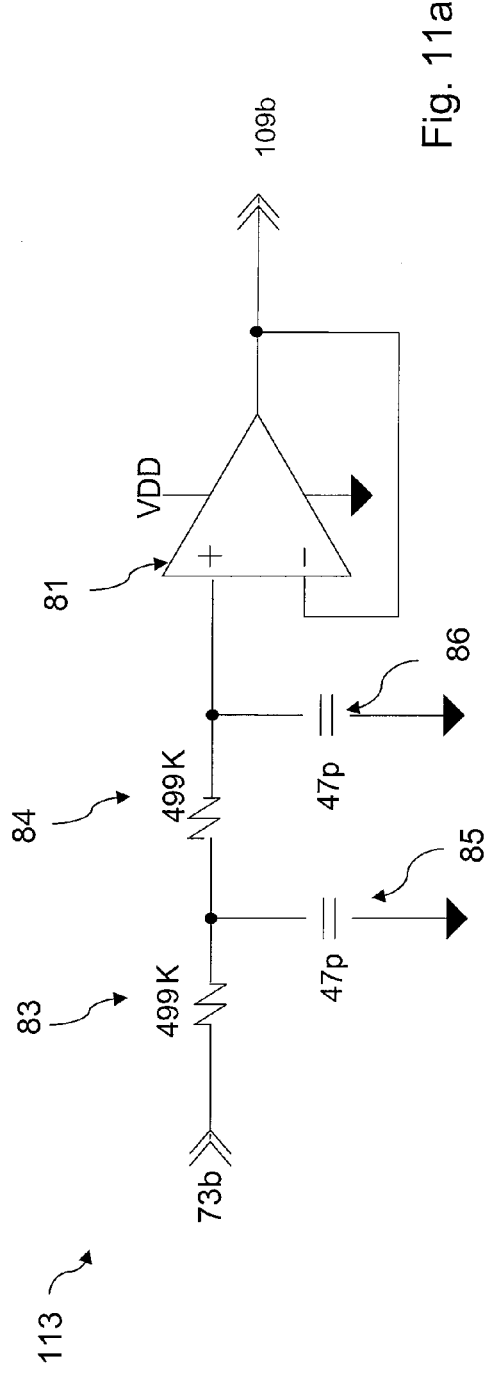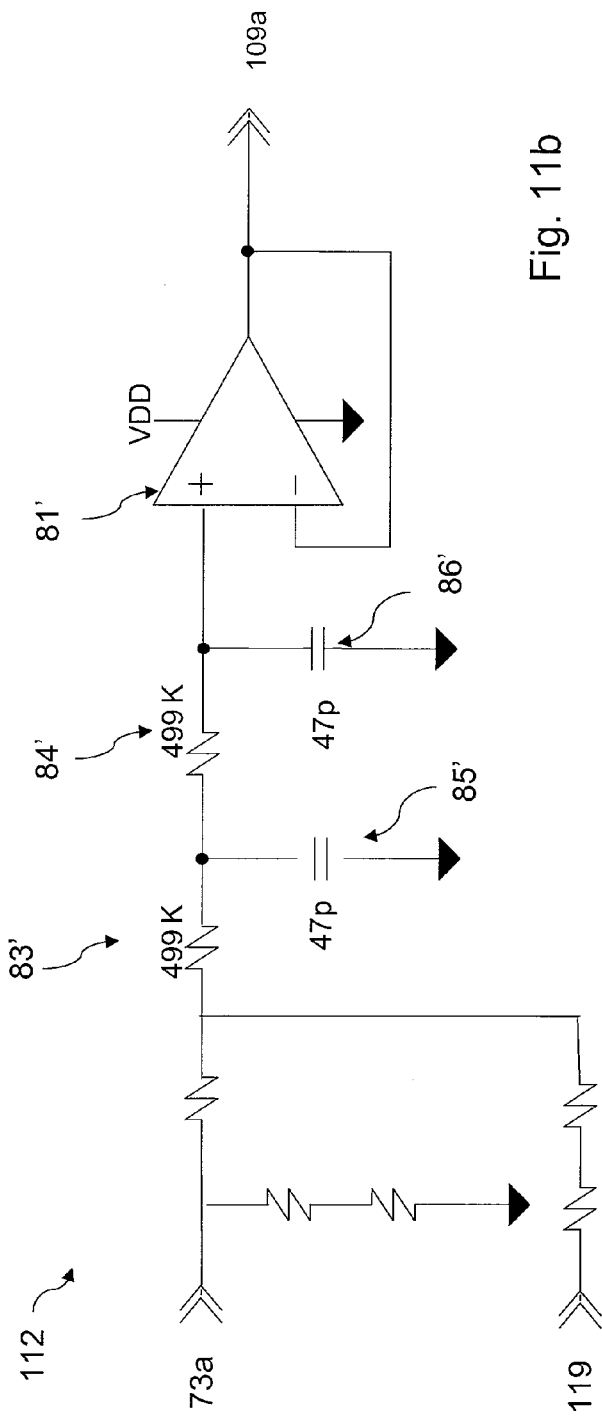

INPUT CHANNEL DIAGNOSTICS

CROSS REFERENCE TO RELATED APPLICATIONS

This application claims priority to U.S. Provisional Application Ser. No. 61/025,508 filed on Feb. 1, 2008 and European Patent Application No. EP08165276 filed on Sep. 26, 2008, the disclosures of which are expressly incorporated herein.

BACKGROUND a. Field of the Invention

This invention relates to Input Channel Diagnostics for an Industrial Process Control System in particular for an Industrial Process Control System Suitable for exemplary systems such as:

Emergency Shutdown systems;
Critical process control systems;
Fire and Gas detection and protection systems;
Rotating machinery control systems;
Burner management systems;
Boiler and furnace control systems; and
Distributed monitory and control systems.

Such control systems are applicable to many industries including oil and gas production and refining, chemical production and processing, power generation, paper and textile mills and sewage treatment plants.

b. Related Art

In industrial process control systems, fault tolerance is of utmost importance. Fault tolerance is the ability to continue functioning safely in the event of one or more failures within the system. Fault tolerance is usually categorised in accordance with a safety integrity level (SIL) scale where a higher SIL means a better safety performance. SILs are defined in standards IEC 61508 (Functional safety of electrical/electronic/programmable electronic safety-related systems) and specifically for the process industry in IEC 61511 (Functional safety—Safety instrumented systems for the process industry sector).

Fault tolerance may be achieved by a number of different techniques, each with its specific advantages and disadvantages.

An example of a system which provides redundancy is a Triple Modular Redundancy (TMR) system. Using TMR, critical circuits are triplicated and perform identical functions simultaneously and independently. The data output from each of the three circuits is voted in a majority-voting circuit, before affecting the system's outputs. If one of the triplicated circuits fails, its data output is ignored. However, the system continues to output to the process the value (voltage, current level, or discrete output state) that agrees with the majority of the functional circuits. TMR provides continuous, predictable operation of systems configured for such operation.

However, TMR systems are expensive to implement if full TMR is not actually a requirement, and it is desirable to utilise an architecture which provides flexibility so that differing levels of fault tolerance can be provided depending upon specified system requirements.

Another approach to fault tolerance is the use of hot-standby modules. This approach provides a level of fault tolerance whereby the standby module maintains system operation in the event of module failure. With this approach there may be some disruption to system operation during the changeover period if the modules are not themselves fault-tolerant.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems generally employ dedicated hardware and software test and diagnostic regimes that provide very fast fault recognition and response times to provide a safer system.

Safety control systems are generally designed to be 'fail-operational/fail-safe'. Fail operational means that when a failure occurs, the system continues to operate: it is in a fail-operational state. The system should continue to operate in this state until the failed module is replaced and the system is returned to a fully operational state.

An example of fail safe operation occurs, for example if, in a TMR system, a failed module is not replaced before a second failure in a parallel circuit occurs, the second failure should cause the TMR system to shut down to a fail-safe state. It is worth noting that a TMR system can still be considered safe, even if the second failure is not failsafe, as long as the first fault is detected and announced, and is itself failsafe.

It is therefore desired to provide an Input Module for an Industrial Control Process that has Input Channel Diagnostics so that faults on any input channels are contained and do not affected the measurement of other parallel modules that are measuring the same source. It is also desirable to be able to test or check the correct functioning of an input module. Finally, if an overload condition occurs, it is also useful if the Input Module can fail safe and detect and report the condition.

SUMMARY OF THE INVENTION

An input module according to the present invention addresses one or more of the problems discussed above. According to one aspect of the invention, there is provided an input circuit for receiving a conditioned sensor signal from a sensor signal source. The input circuit includes one or more series resistors and an operational amplifier. The series resistors have a total resistance which is at least two orders of magnitude greater than the magnitude of the resistance of the conditioned sensor signal source.

Preferably, one or more series resistors comprise two resistors having a combined resistance substantially equal to 1 $M\Omega$. Preferably, the combined resistance is approximately 1000 times a source resistance.

In the preferred aspect, there is a low value capacitor in parallel with the signal source voltage downstream of the first series resistor to provide a low pass noise filter.

According to another aspect of the invention, there is provided a field conditioning circuit for receiving a sensor signal and converting the signal to a desired voltage range for use by an input circuit. The field conditioning circuit includes a sense resistor, a fuse in series with the sense resistor, and an output for determining when the fuse has blown.

Preferably, a Zener diode is oriented in series with the fuse and in parallel with a load resistor for providing load termination wetting current and voltage attenuation.

According to a further aspect of the invention, a field conditioning circuit is provided for receiving a sensor signal and converting the signal to a desired voltage range for use by an input circuit. The field conditioning circuit includes a primary sense resistor in series with a secondary sense resistor, a primary output for detecting a first voltage across the primary sense resistor and the secondary sense resistor, and a secondary output for detecting a second voltage across the secondary sense resistor.

The resistor provides attenuation and the zener diode provides an overdrive to the fuse to ensure the fuse blows in the event of an over-voltage before damaging the more sensitive sense resistors.

According to another aspect of the invention, there is provided a method of fault detection in a field conditioning circuit for a safety critical system. The method includes receiving an input sense signal from a sensor, detecting a first output signal using an output from a primary sense resistor in series with a secondary sense resistor, detecting a second output signal using an output from said primary sense resistor, and sending signals dependent upon said first output signal and said second output signal to a processor for analysis.

Preferably, the method also processes the first output signal with a first high impedance input circuit and an analogue to digital converter and processes the second output signal with a second high impedance input circuit and an analogue to digital converter prior to sending the signals to the processor for analysis.

In the preferred aspect, the method further encodes channel specific error checking data that is sent with the signals to the processor for analysis.

According to another aspect of the invention there is provided a method of internally testing an input channel for a safety critical system. The method includes adding a subliminal perturbation signal to an input signal to be applied to an input circuit. The method detects an output signal from said input circuit and determines whether the addition of said perturbation signal causes a change in said output signal.

BRIEF DESCRIPTION OF THE DRAWINGS

Embodiments of the invention will now be described, by way of example only, with reference to the accompanying drawings, in which:

FIG. 2 schematically illustrates a controller of the industrial process control system illustrated in FIG. 1;

FIG. 3 illustrates a possible configuration of the controller shown in FIG. 2;

FIGS. 11a and 11b are circuit diagrams showing input circuits according to the present invention.

DETAILED DESCRIPTION

Figure 1:
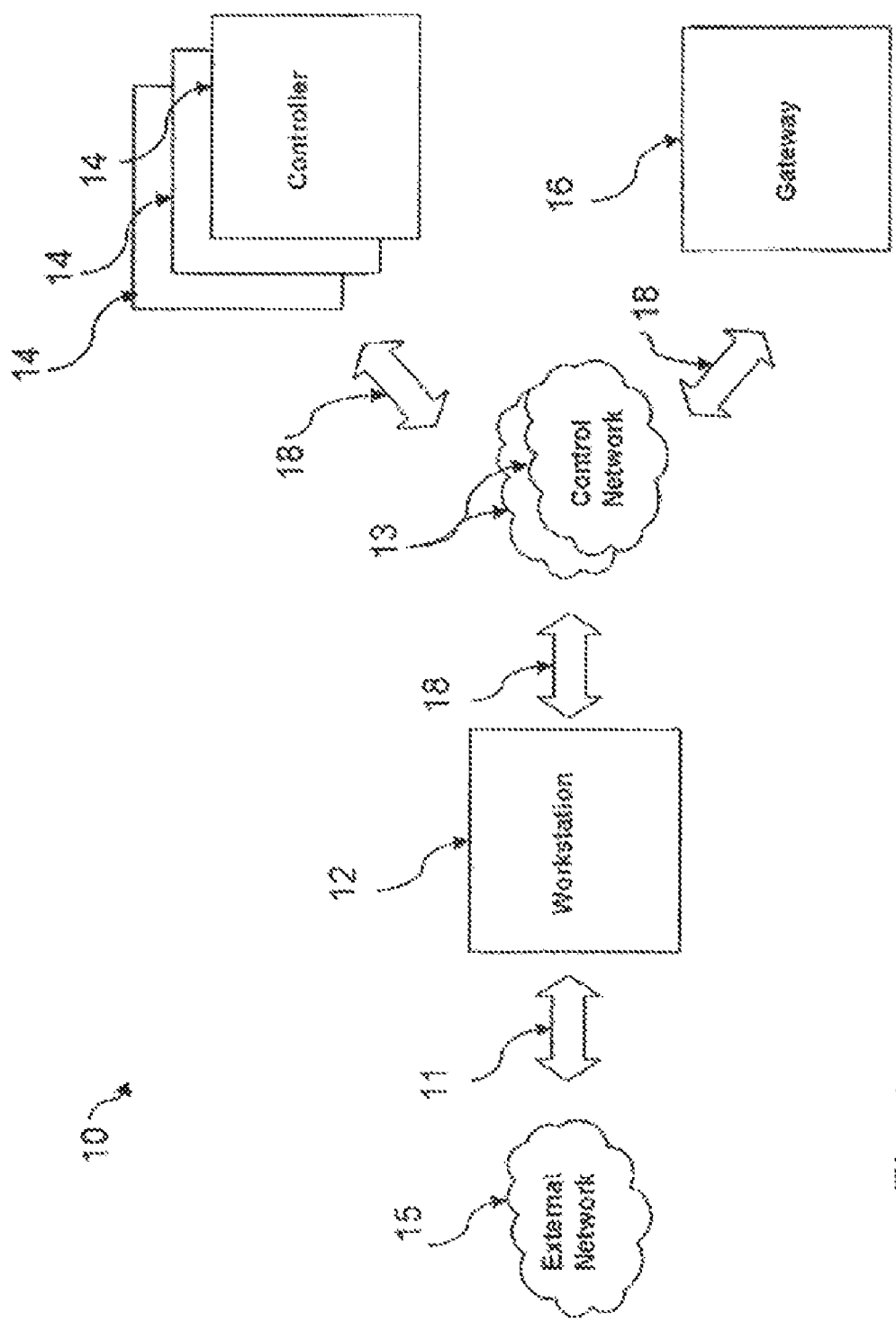
FIG. 1 is an illustration showing the architecture of a distributed industrial process control system equipped with the apparatus and operable according to the methods of the present invention.

In the Industrial Process Control System shown in FIG. 1, a distributed architecture is designed to be used in different SIL environments, so that if a high SIL is required it can be provided, but if a low SIL is all that is needed, the system can be reduced in complexity thereby reducing unnecessary extra costs.

An exemplary Industrial Process Control System 10, comprises a workstation 12 one or more controllers 14 and a gateway 16. The workstation 12 communicates with the controllers 14 and the gateway 16 via Ethernet connections 18 to one or more control networks 13. Multiple Ethernet connections 18 provide redundancy to improve fault tolerance. The workstation 12 may be connected via a conventional Ethernet connection 11 to another external network 15.

A controller 14 will now be described in more detail with reference to FIGS. 2 and 3.

FIG. 2 illustrates a schematic diagram of the controller 14 comprising an input assembly 22, a processor assembly 24 and an output assembly 26. In this schematic illustration the input assembly 24 and output assembly 26 are on different I/O backplanes but they may equally well share a single backplane.

Assemblies 22, 24, 26 are created from one or more communications backplane portions which have three slots to accommodate up to three modules together with termination assemblies which have one two or three slots, and which interface to field sensors and transducers. A termination assembly may straddle two contiguous backplane portions. A module comprises a plug in card with multiple connectors for plugging onto a communications backplane and a termination assembly.

It will be appreciated that having three slots in a communications backplane portion is one design option and other design options with greater (or fewer) slots are possible without departing from the scope of the invention as defined in the appended claims.

FIG. 3 illustrates a possible physical configuration of the controller 14. In this embodiment of the invention, the input assembly 22, output assembly 26 and processor assembly 24 are physically separated from one another by grouping the modules of different types onto separate communications backplanes.

In the example shown, the input assembly 22 comprises two communications backplane portions, 22', 22". The first backplane portion 22' has a triplex input termination assembly and three input modules 22a, 22b, 22c, the second backplane portion 22" has a duplex input termination assembly 22" and two input modules 22d, 22e. The processor assembly 24 comprises a single processor backplane portion 24' having three processor modules 24a, 24b and 24c. The output assembly 26 comprises two backplane portions 26', 26". The first backplane portion 26' has a duplex output termination assembly with two output modules 26a, 26b and the second backplane portion 26" has a simplex output termination assembly with a single output module 26c.

Figure 4:
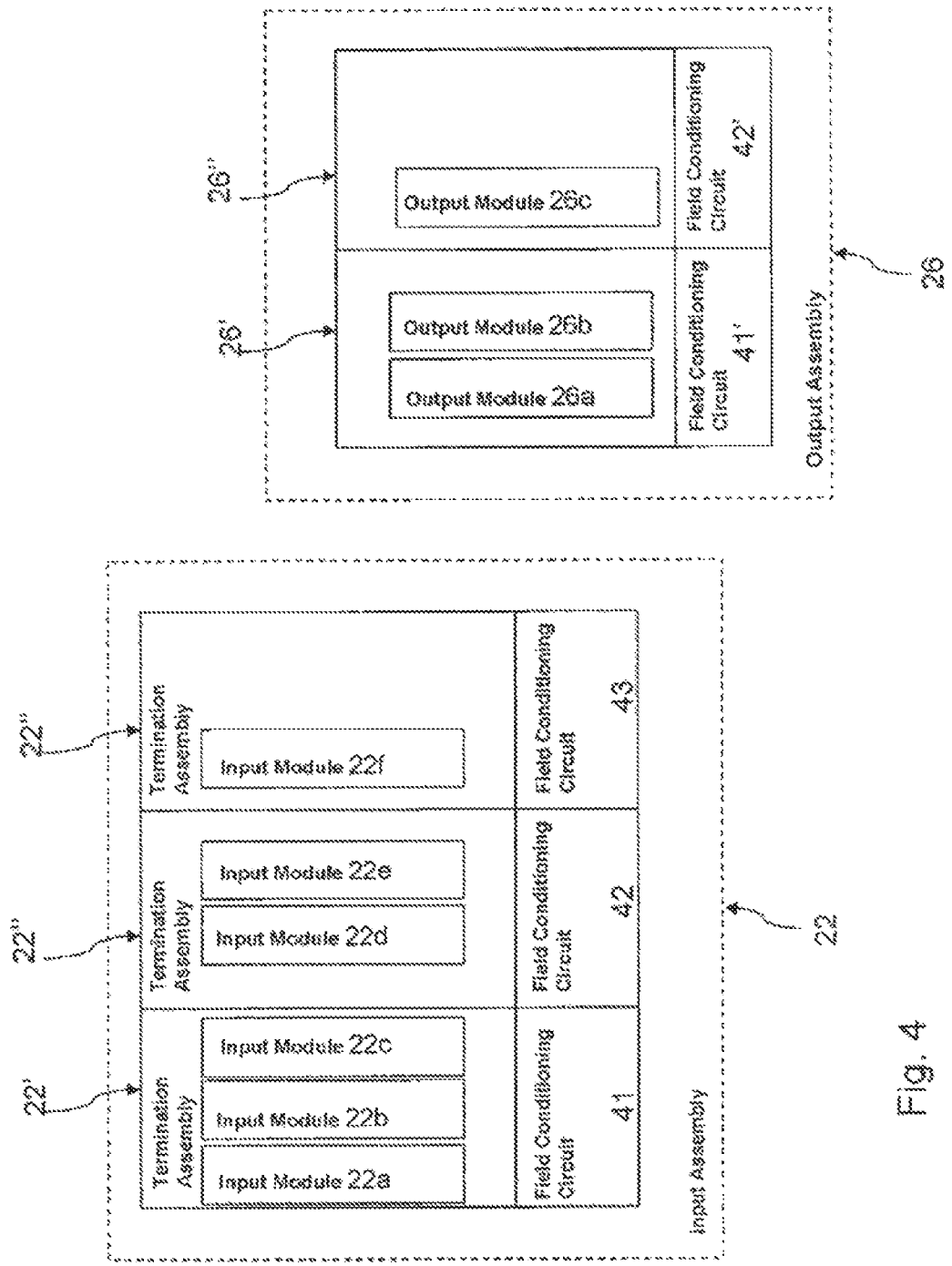
FIG. 4 shows various options for an input assembly and output assembly of FIG. 3.

The flexibility of the input assembly 22, will now be described, in more detail with reference to FIG. 4.

An input assembly 22 comprises one or more backplane portions and termination assemblies 22' 22" 22'" etc. For example, a triplex portion 22' having three modules 22a, 22b, 22c might be used for high availability requirement, a duplex portion 22" having two modules 22d, 22e might be provided for fault tolerant applications and a simplex portion 22'" with a single module 22f might be provided for failsafe applications. The termination assemblies may be provided with different types of field conditioning circuits. For example assembly 22' may be provided with a 24V DC field conditioning circuit 41 assembly 22" may be provided with a 120V DC field conditioning circuit 42 and assembly 22'" may be provided with a 4-20 mA field conditioning circuit 43. Similarly possible configurations are shown for an output assembly 26. It will be appreciated that numerous configurations of backplane portions and termination assemblies with various different numbers of modules and various different types of field conditioning circuits are possible and the invention is not limited to those shown in these examples.

Where an assembly provides more than one module for redundancy purposes it is possible to replace a failed module with a replacement module whilst the industrial process control system is operational which is also referred to herein as online replacement (ie replacement is possible without having to perform a system shutdown). Online replacement is not possible for a simplex assembly without interruption to the process. In this case various "hold last state" strategies may be acceptable or a sensor signal may also be routed to a different module somewhere else in the system.

The processor assembly configures a replacement processor module using data from a parallel module before the replacement module becomes active.

The field conditioning circuits 41, 42, 43 transform a signal received from a sensor monitoring industrial process control equipment to a desired voltage range, and distribute the signal to the input modules as required. Each field conditioning circuit 41, 42, 43 is also connected to field power and field return (or ground) which may be independently isolated on a channel by channel basis from all other grounds, depending on the configuration of the input termination assembly. Independent channel isolation is the preferred configuration because it is the most flexible. The field conditioning circuits 41, 42, 43 comprise simple non active parts and are not online replaceable.

Figure 5:
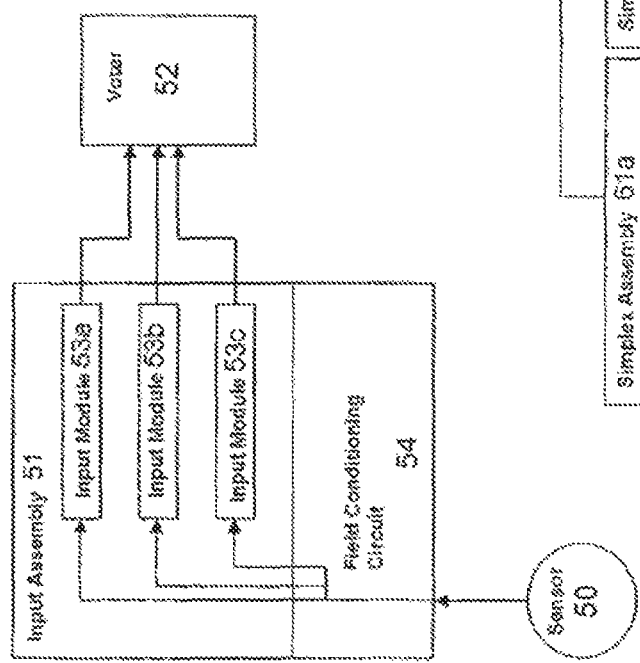
FIG. 5 shows one possible configuration of an input module system implementing a two out of three voting strategy.
Figure 6:
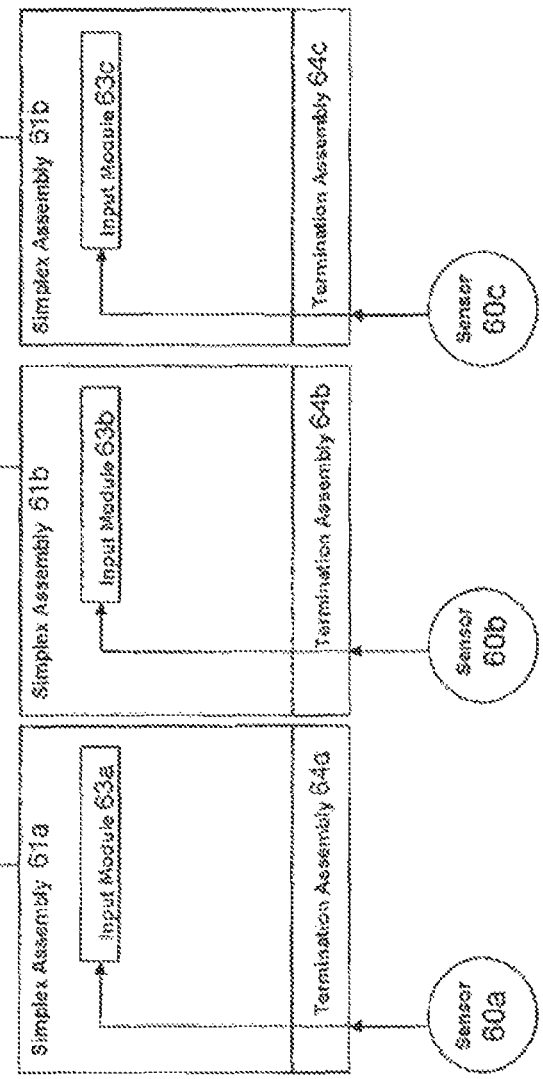
FIG. 6 illustrates a second possible configuration of an input module system for a two out of three voting strategy.

FIG. 5 and FIG. 6 illustrate the flexibility of the architecture described herein showing different configurations for a triplex system for generating a SIL3 signal with a high availability requirement. Referring to FIG. 5, a three module input assembly 51 receives a signal from a sensor 50 via a field conditioning circuit in termination assembly 54. The field conditioning circuit 54 transforms the signal to a desired voltage range and distributes the signal to three replicated input modules 53a, 53b, 53c. Each input module processes the signal and the results are sent to a two out of three voter 52 to generate a result signal in dependence thereon.

Referring to FIG. 6, replicated sensors 60a, 60b, 60c each send a signal to a respective simplex assemblies 61a, 61b, 61c via respective field conditioning circuits in termination assemblies 64a, 64b, 64c. Each input module 63a, 63b, 63c processes the signal and sends an output to a two out of three voter 62 to generate a signal in dependence thereon. It will be appreciated that many variations and configurations are possible in addition to those illustrated here.

Figure 7:
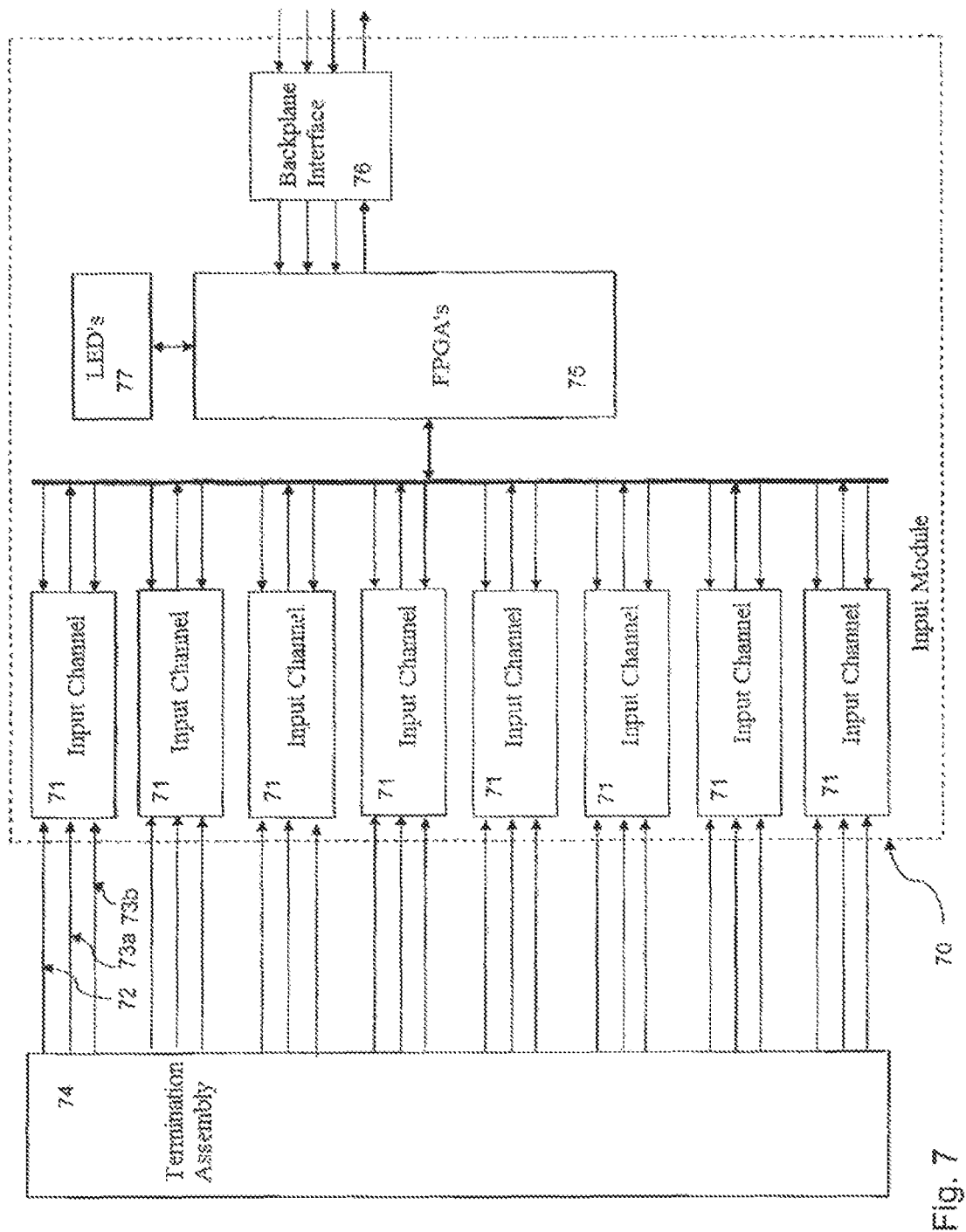
FIG. 7 is a schematic illustration showing an input module.

FIG. 7 illustrates schematically an input module 70 in accordance with the present invention:

An input module 70 comprises eight isolated channels 71. Each channel 71 receives signals 72, 73a, 73b from field conditioning circuits in a termination assembly 74. Each channel communicates with a field programmable gate array (FPGA) 75 which interfaces to an I/O backplane (not shown) via a non-isolated backplane interface 76. Light emitting diodes (LEDs) 77 are used to indicate status of the module via red and green indicators.

It will be appreciated that having eight channels is one design option and other design options with greater (or fewer) channels are possible without departing from the scope of the invention as defined in the appended claims.

The termination assembly 74, and signals 72, 73a, 73b will now be described in more detail with reference to FIGS. 8 and 9.

Figure 8:
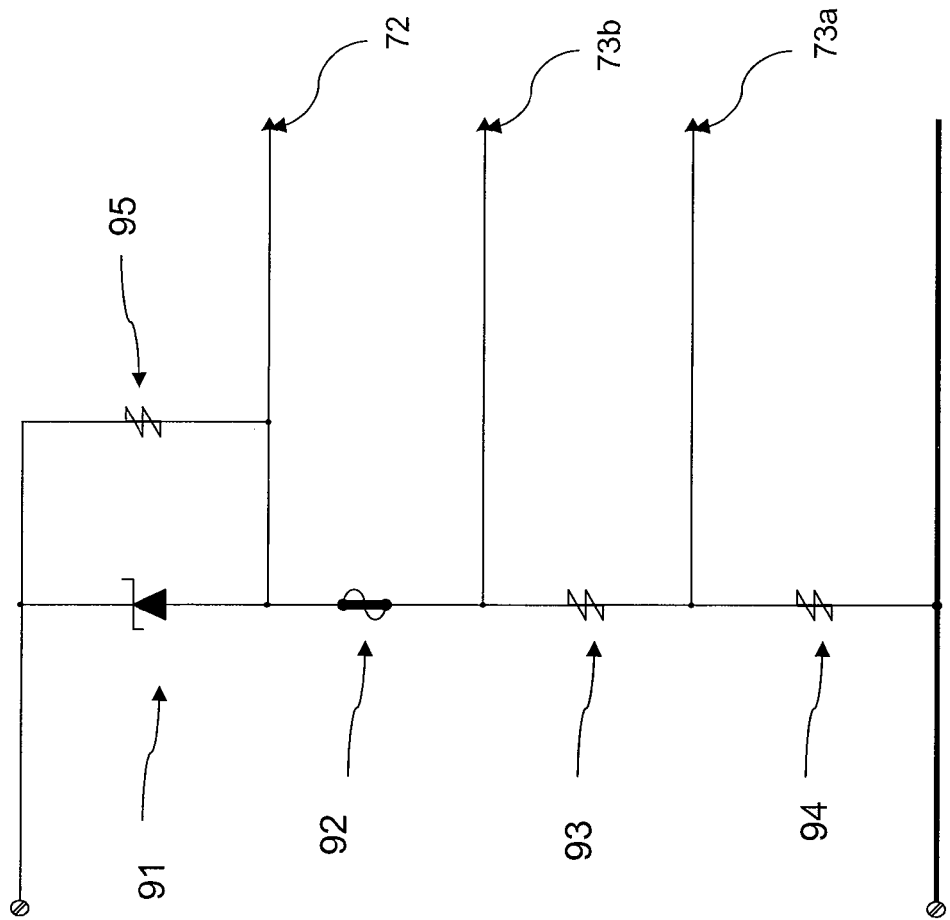
FIG. 8 is a circuit diagram of a digital input termination assembly according to the present invention.
Figure 9:
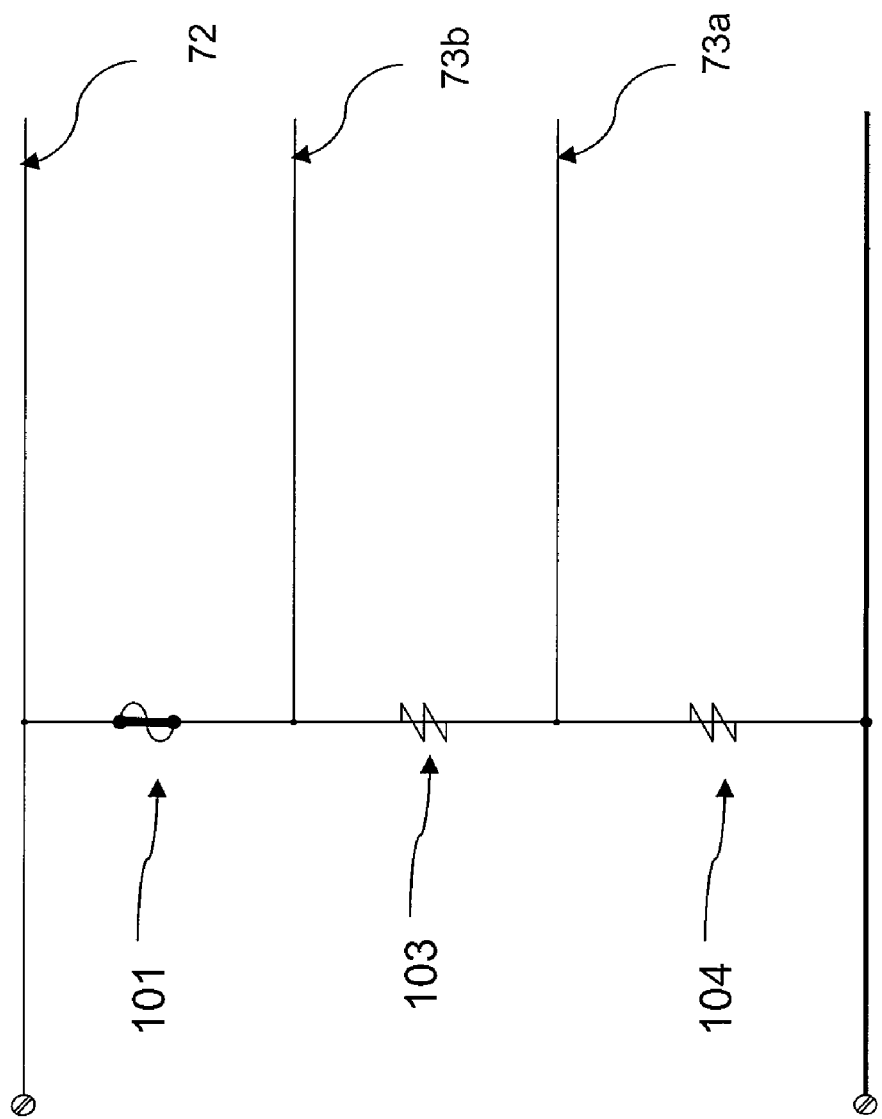
FIG. 9 is a circuit diagram of an analogue input termination assembly according to the present invention.

FIG. 8 illustrates a digital input field conditioning circuit in accordance with the present invention and FIG. 9 illustrates an analogue input field conditioning circuit in accordance with the present invention.

Referring now to FIG. 8, a digital input field conditioning circuit for measuring high level field input voltages comprises an avalanche or Zener diode 91 connected in series with a fuse 92. The diode 91 forces the fuse to blow when an extreme overload is applied to the input. A blown fuse signal 72 is output to the input module to allow the input module to sense and report a blown fuse condition.

In a preferred embodiment of the invention a first sense resistor 93 has a resistance of 100Ω and a second sense resistor 94 has a resistance of 20Ω. The use of the fuse means that the sense resistors 93, 94 only need to operate to the maximum rating of the fuse, which in the preferred embodiment is 50 mA. In the preferred embodiment the Zener diode 91 is connected in parallel with a resistor 95. The resistor 95 is used to provide a "wetting current" termination resistance for providing current to the sense resistors 93, 94, in addition to providing voltage attenuation.

Referring to FIG. 9, an analogue input field conditioning circuit for measuring field 4-20 mA analogue current loop signals comprises a fuse 101 in series with sense resistors 103, 104. Again, the use of the fuse means that the sense resistors 93, 94 only need to operate to the maximum rating of the fuse, which in the preferred embodiment is 50 mA. Again, a blown fuse signal 72 is output to the input module to allow the input module to sense and report a blown fuse condition. The field conditioning circuits shown in FIG. 8 and FIG. 9 output a primary sense signal 73a and a secondary sense signal 73b, use of which by the input channel 71 will now be described in more detail with reference to FIG. 10.

The input channel 71 comprises a blown fuse circuit 111, a primary input circuit 113 and a secondary input circuit 112.

Figure 10:
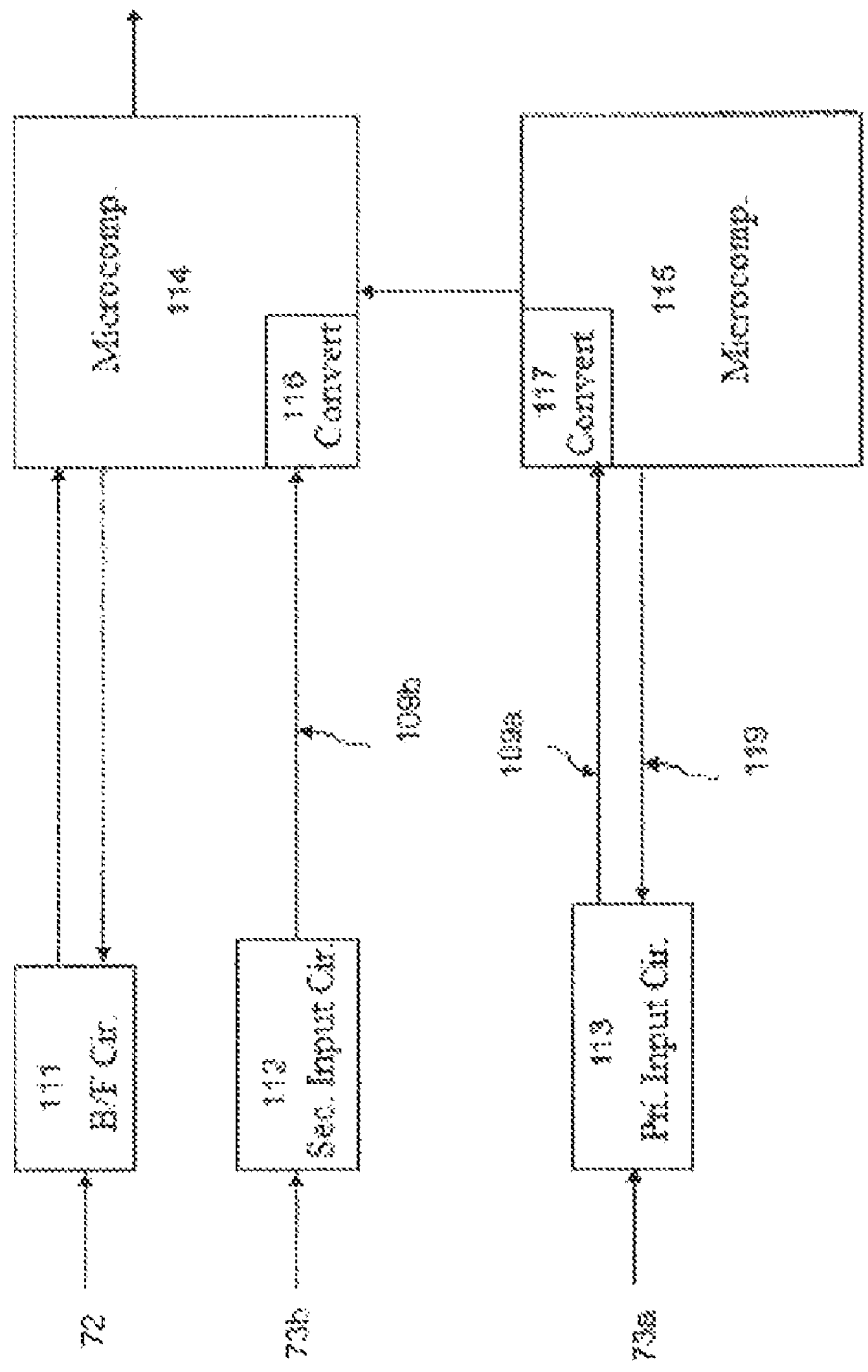
FIG. 10 is a diagram of an input channel.

FIG. 10 illustrates how the secondary parallel heterogeneous measurement channel 112 is used to sense the secondary sense signal 73b for the purpose of determining the correct operation of the primary measurement device. The secondary channel measures the secondary sense signal 73b using the additional sensing resistor 94/104 which is in series with the resistor 93/103 utilized by the primary channel.

Use of the secondary channel allows drift faults to be detected in either of the sense resistors, the input conditioning circuitry and the a/d converter in a field conditioning circuit to a specified level of safety accuracy.

Signal 73b from the series combination of sense resistors 103 and 104 (or 93, 94) is connected to secondary input circuit 112. Input circuit 112 sends an analogue output signal 109b to microcomputer 114 where it is converted by a ten bit resolution A/D converter 116 to a digital secondary sense signal.

Similarly, signal 73a from sense resistor 104 (or 94) is connected to primary input circuit 113. Input circuit 113 sends an analogue output signal 109a to microcomputer 115 where it is converted by a sixteen bit resolution A/D converter 117 to a digital primary sense signal.

It will be appreciated that the precision of the A/D converters in the preferred embodiment is merely one design option and other design options with greater (or less) precision is possible without departing from the scope of the invention as defined in the appended claims.

Microcomputer 115 sends the digital primary sense signal to microcomputer 114 where together with the digital secondary sense signal it is sent to the FPGA 75 (FIG. 7) for onward transmission to a processor module for analysis.

The processor module compares the two sense signals and reports any discrepancy to within a predetermined level of accuracy.

The high resolution primary signal is inspected for changes in the least significant bits. Microcomputer 115 generates a small perturbation signal 119 which may be added to the primary analogue sense signal 73a if the input signal is of a static nature ie if there has been no change in the least significant bits for a predetermined time. Because of the high resolution of the A/D converter 117 it is an inherent property of the system that there should be noise registered by the least significant bits.

The perturbation test signal amplitude is scaled to be of subliminal amplitude relative to the final output specified resolution, which in the preferred embodiment of the invention is twelve bits, but is adequate to ensure that the input channel is capable of registering dynamic activity ie by causing a change to the value of the least significant bits.

Calibration coefficients for the input channels are stored locally in each microcomputer 114, 115. When the channels are calibrated the channel number is stored with the calibration data to provide for the detection of channel independence faults. The channel number is factored into a cyclic redundancy check (CRC) code which is sent from the microprocessor 114 to the processor module so that any interference between channels will be detected by a CRC error detected by the processor module.

Because two resistors in series are used in the field conditioning circuits in the termination assembly it is possible to detect safety critical drift discrepancies that occur on them. If more than one input module is installed to monitor the termination assembly voltages then the discrepancy fault may be isolated to the termination assembly, or one of the input module measurement channels.

In systems employing redundancy it is important that a short circuit fault on one input circuit is prevented from influencing the measurement made by another replicated input circuit which is receiving the same signal.

FIG. 11a illustrates an input circuit 112 comprising a low input current low offset voltage operation amplifier 81 (such as Analog Devices AD8538). The operational amplifier 81 receives an input signal 73b via two high value resistors 83, 84 connected in series with the input signal to provide an accurate voltage follower. In this embodiment, the value of each resistor 83, 84 is 499 KΩ thereby providing a total series resistance of approx 1 MΩ. This provides a limit on the input current in the event of a short-circuit fault (or a low impedance short-circuit type of fault). It is further envisioned that, rather than providing a static resistance threshold such as 1 MΩ as discussed above, the series resistance could be provided as a function of the resistance of the source signal. One such configuration provides a series resistance that is about 1000 times greater than the source resistance.

FIG. 11b illustrates a similar input circuit 113 having a test path for receiving the perturbation test signal 119. Similar components in FIGS. 11a and 11b are labelled with similar numbers marked with prime.

For those embodiments equipped with series resistance of approximately 1 MΩ, if the signal source has an input resistance of 1KΩ, then the signal disturbance caused by such a fault will be less than 0.1% due to the fact that the series resistance is approximately three orders of magnitude greater than the resistance of the signal source. It is preferred that the combined resistance is at least two orders of magnitude greater than the signal source resistance and it is even more preferable if the combined resistance is at least three orders of magnitude greater than the signal source resistance. Preferably one or more low value capacitors are provided to provide low pass noise filtering. If the capacitor has a value of 47 pF then the cut-off frequency of the low-pass filter is 6.8 KHz. A short circuit failure of capacitor 85, 86, associated with the respective signal path filtering, would result in a 0.2% disturbance from a signal source having an input resistance of 1 KΩ. However, in the preferred embodiment of the invention, the signal source resistance is 120Ω.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention as defined in the appended claims.

The invention claimed is:

1. An input circuit for receiving a conditioned sensor signal from a conditioned sensor signal source, the input circuit comprising:
    one or more series resistors, wherein each series resistor comprises at at least two resistors that are connected in series with one another;
    an operational amplifier configured to receive an input signal via the one or more series resistors; and
    wherein the series resistors have a total resistance which is at least two orders of magnitude greater than the magnitude of the resistance of the conditioned sensor signal source.

2. An input circuit according to claim 1, in which said one or more series resistors comprise two resistors having a combined resistance substantially equal to 1 MΩ.

3. An input circuit according to claim 1, in which said one or more series resistors comprise two resistors having a combined resistance that is approximately 1000 times greater than the resistance of the conditioned sensor signal source.

4. An input circuit according to claim 1, further comprising a low value capacitor in parallel with the signal source voltage to provide a low pass noise filter.

5. A field conditioning circuit for receiving a sensor signal and converting said sensor signal to a desired voltage range for use by an input circuit, the field conditioning circuit comprising:
    a primary sense resistor;
    a secondary sense resistor that is in series with the primary sense resistor
    a fuse in series with said primary sense resistor;
    a Zener diode in series with said fuse and in parallel with a load resistor for providing a load termination wetting current and voltage attenuation; and
    an output for determining when said fuse has blown.

6. A field conditioning circuit according to claim 5 wherein the output includes:
    a primary output that detects a first voltage across the primary sense resistor and the secondary sense resistor; and
    a secondary output for detecting a second voltage across the secondary sense resistor.

7. A method of fault detection in a field conditioning circuit for a safety critical system, the method comprising:
    receiving an input sense signal from a sensor;
    detecting a first output signal from an operational amplifier that receives an output of a primary sense resistor that is in series with a secondary sense resistor and wherein a total resistance of the primary sense resistor and the secondary sense resistor is two orders of magnitude greater than a magnitude of resistance of the input sense signal;

detecting a second output signal from an output of the primary sense resistor; and communicating signals dependent upon the first output signal and the second output signal to a processor for analysis.

8. A method according to claim 7, further comprising:

processing the first output signal with a first high impedance input circuit and an analogue to digital converter; and processing the second output signal with a second high impedance input circuit and an analogue to digital converter;

prior to communicating the signals to the processor for analysis.

9. A method according to claim 8, further comprising encoding channel specific error checking data and communicating the channel specific error checking data with the signals to a system processor for analysis.

10. A method of internally testing an input channel for a safety critical system, the method comprising:

adding a perturbation signal to an input signal to be applied to an input circuit and the input signal is passed from an input circuit that includes one or more series resistors, each series resistor including at least two resistors that are connected in series with one another, that have a total resistance that is at least two orders of magnitude greater than the resistance of a conditioned sensor signal source;

detecting an output signal from the input circuit; and determining whether addition of said perturbation signal causes a change in said output signal.

11. The method of claim 10 wherein the perturbation signal is determined to be a subliminally scaled amplitude of an operating value of the output signal.

12. The method of claim 10 further comprising storing an input channel identity value locally on at least one channel processor.

13. The method of claim 12 further comprising comparing the input channel identity value to the detected output signal to detect individual channel independence faults.

14. The method of claim 10 wherein the series resistors resistance is three orders of magnitude greater than the resistance of the conditioned sensor signal source.

15. The method of claim 10 further comprising low pass noise filtering the conditioned sensor signal source by positioning a low value capacitor in parallel with a signal source voltage.

16. The method of claim 10 further comprising passing the input signal through a fuse that is oriented in series with the one or more series resistors and has an operating threshold that is lower than an operating threshold of the one or more series resistors.

17. The method of claim 16 further comprising providing a load termination wetting current and a voltage attenuation by a Zener diode oriented in series with the fuse and in parallel with one or more series resistors.

* * * * *